(12) United States Patent
Lakshmikantha et al.

(10) Patent No.: US 10,446,119 B1
(45) Date of Patent: Oct. 15, 2019

(54) METHOD FOR SUPPORTING MULTIPLE LAYERS IN SPLIT RENDERING

(71) Applicant: QUALCOMM Incorporated, San Diego, CA (US)

(72) Inventors: Sandeep Kanakapura Lakshmikantha, Ramanagar District (IN); Pawan Kumar Baheti, Bangalore (IN); Ajit Venkat Rao, Bangalore (IN); Tushit Jain, Marathahalli (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/104,730

(22) Filed: Aug. 17, 2018

(51) Int. Cl.
| | |
|---|---|
| *G06T 9/00* | (2006.01) |
| *G09G 5/377* | (2006.01) |
| *G06F 3/01* | (2006.01) |
| *A63F 13/53* | (2014.01) |

(52) U.S. Cl.
CPC ............ *G09G 5/377* (2013.01); *A63F 13/53* (2014.09); *G06F 3/012* (2013.01); *G06T 9/00* (2013.01); *G09G 2320/103* (2013.01); *G09G 2320/106* (2013.01); *G09G 2350/00* (2013.01); *G09G 2352/00* (2013.01); *G09G 2354/00* (2013.01)

(58) Field of Classification Search
None
See application file for complete search history.

(56) References Cited

U.S. PATENT DOCUMENTS

2015/0084986 A1* 3/2015 Lee .................. G06T 11/00
345/629

* cited by examiner

*Primary Examiner* — Nicholas R Wilson
(74) *Attorney, Agent, or Firm* — Holland & Hart LLP

(57) ABSTRACT

Methods, systems, and devices for split rending of multiple graphic layers are described. An extended reality (XR) system may include a processing device that generates and renders multiple graphic layers and a display device that displays the graphic layers to create a virtual environment. The processing device may divide the multiple graphic layer into sets of graphic layers and composite each set into a composite layer for transmission to the display device over a respective stream. Each group of graphic layers may include graphic layers of the same type that are consecutively ordered with respect to their Z orders and that have similar frame rates.

20 Claims, 8 Drawing Sheets

METHOD FOR SUPPORTING MULTIPLE LAYERS IN SPLIT RENDERING

BACKGROUND

An extended reality (XR) system may provide graphics for a user using digital or virtual image information. In some cases, an XR system may implement split rendering in which the graphic workload is split between multiple components. For example, the XR system may include rendering hardware (e.g., a personal computer (PC)) and display hardware (e.g., a head-mounted display (HMD)). To generate high quality graphics, the XR system may render more than one graphic layer (e.g., multiple layers). For instance, the XR system may render each graphic layer in a different pass, then combine the graphic layers to make a complete frame.

In addition to streaming multiple layers, split rendering may also require high video bitrate (e.g., to reach an almost lossless quality) and high frame rate (e.g., to avoid judder). But throughput limitations make it difficult for video encode/decode hardware to stream multiple layers/streams at high video bit rate and frame rate. And the bandwidth required to stream multiple concurrent video streams can strain communications networks. So there may be a limit on how many high frame rate/bit rate graphic layers can be streamed at once. Techniques for supporting multiple graphic layers with high bit and frame rates in XR systems may be desirable.

SUMMARY

Methods and systems for split rendering of multiple graphic layers are described. A processing device may generate multiple graphic layers for display at a remote display device. The processing device may group the graphic layers so that each group includes graphic layers that a) are of the same type, b) are consecutively ordered (e.g., with respect to their Z orders) and c) have similar frame rates (e.g., frame rates within a certain threshold). The processing device may composite each group of graphic layers into a respective composite layer and send each composite layer to the display device over a respective stream. The number of streams used to convey the composite layers may be less than the number of graphic layers that make up the composite layers. The display device may process the composite layers and render them for display.

A method of rendering at a device is described. The method may include generating a set of graphic layers, each graphic layer of the set of graphic layers associated with a Z order, frame rate, and type, sorting the set of graphic layers based on a Z order of each graphic layer, constructing, for each type of graphic layer, one or more sets of graphic layers with consecutive Z orders, dividing each of the one or more sets of graphic layers into one or more subsets of graphic layers based on a frame rate for each graphic layer in the one or more sets of graphic layers, compositing each subset of graphic layers into a respective composite layer associated with a frame rate that is based on a frame rate for each graphic layer in the one or more subsets of graphic layers, and transmitting, to a display device, the composite layers in a set of streams each including a different composite layer.

An apparatus for rendering at a device is described. The apparatus may include a processor, memory in electronic communication with the processor, and instructions stored in the memory. The instructions may be executable by the processor to cause the apparatus to generate a set of graphic layers, each graphic layer of the set of graphic layers associated with a Z order, frame rate, and type, sort the set of graphic layers based on a Z order of each graphic layer, construct, for each type of graphic layer, one or more sets of graphic layers with consecutive Z orders, divide each of the one or more sets of graphic layers into one or more subsets of graphic layers based on a frame rate for each graphic layer in the one or more sets of graphic layers, composite each subset of graphic layers into a respective composite layer associated with a frame rate that is based on a frame rate for each graphic layer in the one or more subsets of graphic layers, and transmit, to a display device, the composite layers in a set of streams each including a different composite layer.

Another apparatus for rendering at a device is described. The apparatus may include means for generating a set of graphic layers, each graphic layer of the set of graphic layers associated with a Z order, frame rate, and type, sorting the set of graphic layers based on a Z order of each graphic layer, constructing, for each type of graphic layer, one or more sets of graphic layers with consecutive Z orders, dividing each of the one or more sets of graphic layers into one or more subsets of graphic layers based on a frame rate for each graphic layer in the one or more sets of graphic layers, compositing each subset of graphic layers into a respective composite layer associated with a frame rate that is based on a frame rate for each graphic layer in the one or more subsets of graphic layers, and transmitting, to a display device, the composite layers in a set of streams each including a different composite layer.

A non-transitory computer-readable medium storing code for rendering at a device is described. The code may include instructions executable by a processor to generate a set of graphic layers, each graphic layer of the set of graphic layers associated with a Z order, frame rate, and type, sort the set of graphic layers based on a Z order of each graphic layer, construct, for each type of graphic layer, one or more sets of graphic layers with consecutive Z orders, divide each of the one or more sets of graphic layers into one or more subsets of graphic layers based on a frame rate for each graphic layer in the one or more sets of graphic layers, composite each subset of graphic layers into a respective composite layer associated with a frame rate that is based on a frame rate for each graphic layer in the one or more subsets of graphic layers, and transmit, to a display device, the composite layers in a set of streams each including a different composite layer.

Some examples of the method, apparatuses, and non-transitory computer-readable medium described herein may further include operations, features, means, or instructions for encoding each composite layer prior to transmitting and selecting the bandwidth for each stream based on the frame rate of the associated composite layer.

Some examples of the method, apparatuses, and non-transitory computer-readable medium described herein may further include operations, features, means, or instructions for detecting a change in one or more frames of a graphic layer of the set of graphic layers since the graphic layer was last transmitted and determining the frame rate for the graphic layer based on the detection.

In some examples of the method, apparatuses, and non-transitory computer-readable medium described herein, detecting that the graphic layer may have changed may include operations, features, means, or instructions for computing the difference between a last streamed frame of the graphic layer and a current frame of the graphic layer.

In some examples of the method, apparatuses, and non-transitory computer-readable medium described herein, detecting that the graphic layer may have changed may include operations, features, means, or instructions for determining that a magnitude of a motion vector of the graphic layer satisfies a threshold.

Some examples of the method, apparatuses, and non-transitory computer-readable medium described herein may further include operations, features, means, or instructions for determining, in response to detecting the change, a frequency of change in the graphic layer. In some example, the method, apparatuses, and non-transitory computer-readable medium described herein may further include operations, features, means, or instructions for assigning a frame rate to the graphic layer based on the frequency of change of the graphic layer.

Some examples of the method, apparatuses, and non-transitory computer-readable medium described herein may further include operations, features, means, or instructions for re-compositing a subset of graphic layers when one of the graphic layers of the subset changes and transmitting the re-composited subset of graphic layers as a composite layer.

Some examples of the method, apparatuses, and non-transitory computer-readable medium described herein may further include operations, features, means, or instructions for selecting the frame rate associated with each composite layer from a set of candidate frame rates.

Some examples of the method, apparatuses, and non-transitory computer-readable medium described herein may further include operations, features, means, or instructions for determining a maximum frame rate of the graphic layers in the one or more subsets of graphic layers and selecting the frame rate associated with the composite layer based on the maximum frame rate.

In some examples of the method, apparatuses, and non-transitory computer-readable medium described herein, the set of streams may be less than the set of graphic layers.

A system for split rendering is described. The system may include a processing device and a display device. The processing device may be configured to generate a plurality of graphic layers; determine a Z order, frame rate, and type for each graphic layer; divide the plurality of graphic layers into a plurality of graphic layer groups based on the Z order, frame rate, and type of each graphic layer, the plurality of graphic layer groups less than the plurality of graphic layers; composite, for each graphic layer group, the graphic layers of the graphic layer group into a respective composite layer; and transmit the composite layers in a plurality of streams each comprising a different composite layer. The display device may be configured to receive the composite layers in the plurality of streams; perform asynchronous time warp (ATW) on one or more of the composite layers; and display the composite layers.

In some cases, a first type of layer comprises layers that change based on the head position of the user, and a second type of layer comprises layers that do not change based on the head position of the user. In some cases, the display device may be configured to transmit to the processing device an indication of a head position of a user of the display device. In some cases, the processing device may be configured to generate at least one graphic layer of the plurality of graphic layers based on the head position of the user.

DETAILED DESCRIPTION

An extended reality (XR) system may implement split rendering by dividing the graphics workload between a processing device (e.g., a processing device, such as a personal computer (PC)) and a display device (e.g., a wearable display device, such as a head mounted display (HMD)). For example, a PC may render multiple graphic layers and transmit them to an HMD for display to a user. But transmitting the graphic layers from the PC to the HMD may strain the encode/decode abilities of the involved devices, and the bandwidth to stream multiple graphic layers in parallel (e.g., at the same time) may burden the serving communications network.

According to the techniques described herein, a processing device may reduce encoding/decoding requirements, and reduce bandwidth consumption, by combining multiple graphic layers into composite layers for transmission over parallel (e.g., simultaneous) streams. For example, the processing device may combine N graphic layers so that they form M composite layers that are transmitted over M streams, wherein N is greater than M. To simplify encoding and composition, the graphic layers included in each composite layer may be selected so that they are similar (e.g., in type and frame rate) and closely positioned (e.g., in terms of Z order).

Aspects of the disclosure are initially described in the context of a split XR system. Aspects of the disclosure are further illustrated by and described with reference to apparatus diagrams, system diagrams, and flowcharts that relate to a system and devices that support multiple graphic layers for XR.

Figure 1:
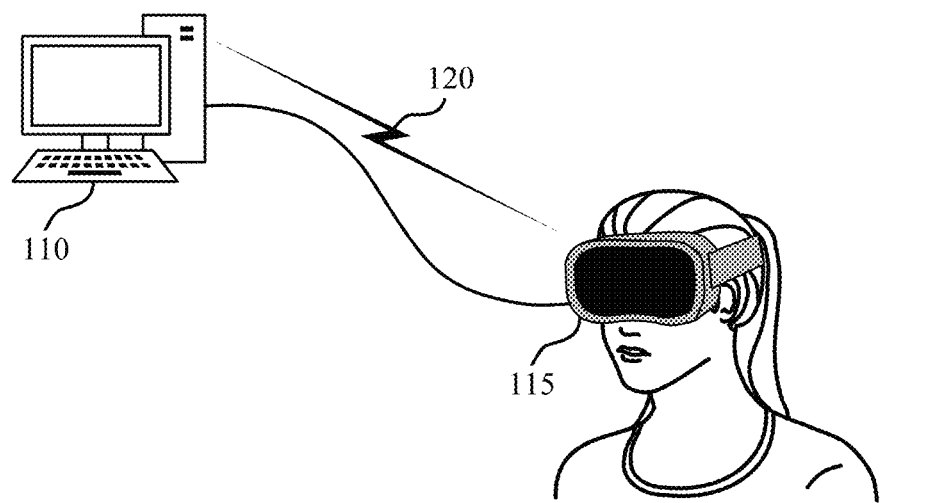
FIG. 1 illustrates an example of a split extended reality (XR) system that supports multiple graphic layers for XR in accordance with aspects of the present disclosure.

FIG. 1 illustrates an example of a split XR system 100 that supports multiple graphic layers for XR in accordance with aspects of the present disclosure. The split XR system 100 may include a processing device 110 (which may also be referred to as a rendering device), and a display device 115. The processing device 110 may be stationary and/or mobile. In some examples, the processing device 110 may be a personal computing device, a desktop, a laptop, mobile computing device, or a head mounted display (HMD), etc. The processing device 110 may additionally, or alternatively, include or be referred to by those skilled in the art as a user equipment (UE), a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology.

The processing device 110 may include memory, a processor, an output, and a communication module. The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth storing a set of processor-readable instructions that may be stored at the memory and executed at the processor) associated with executing an application, such as, for example, performing frequency synchronization and phase correction. The processor may be a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), and/or the like.

The processing device 110 may be configured to allocate graphics resources, handle audio and/or video streams, and/or render multimedia content (e.g., render audio and/or video streams) for an XR experience as described herein. For example, the processing device 110 may communicate one or more graphic layers with the display device 115 to provide an XR experience. A graphic layer may be made up of a multiple frames, which may be stereoscopic three dimensional (3D) visualizations for presentation. The frame rate of a graphic layer may represent the number of frames generated, output, or transmitted per second (e.g., the frame rate of a graphic layer may be 30 frames per second (fps)).

The processing device 110 and the display device 115 may be able to communicate directly with each other over wired or wireless interfaces. For example, the processing device 110 may communicate with the display device 115 wirelessly via communication link 120. For example, the processing device 110 and the display device 115 may be able to communicate directly with each other (e.g., using a peer-to-peer (P2P) or device-to-device (D2D) protocol) or another device such as: a user equipment (UE), a user device, a smartphone, a BLUETOOTH® device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. Additionally or alternatively, the processing device 110 may communicate with the display device 115 via a wired connection 125.

In some cases, the processing device 110 may generate multiple graphic layers for display at display device 115. In such cases, processing device 110 may transmit each graphic layer (e.g., to display device 115) over a communication stream dedicated to that graphic layer. But transmitting a stream for each individual graphic layer may consume excess communication resources (e.g., frequency and time resources). As described herein, a processing device 110 may reduce communication resource consumption (e.g., bandwidth consumption) by combining multiple graphic layers into composite layers prior to transmission. Since each stream conveys a composite layer that represents multiple graphic layers, the same number of graphic layers can be communicated using fewer streams (compared to a system that uses a stream for each graphic layer). Thus, N graphic layers may be communicated to display device 115 using M streams, where N is greater than M.

The display device 115 may be an HMD. As an HMD, the display device 115 may be worn by a user. In some examples, the display device 115 may be configured with one or more sensors to sense a position of the user and/or an environment surrounding the HMD to generate information when the user is wearing the HMD. The information may include movement information, orientation information, angle information, etc. regarding the display device 115. In some cases, the display device 115 may be configured with a microphone for capturing audio and one or more speakers for broadcasting audio. The display device 115 may also be configured with a set of lenses and a display screen for the user to view and be part of the XR experience. According to the techniques described herein, a display device 115 may receive composite layers from a processing device 110 and process the composite layers for display to a user.

In some cases, the processing device 110 may communicate indirectly with the display device 115. For example, the split XR system 100 may also include a base station, a server, and a database. The server may be a computing system or an application that may be an intermediary node in the split XR system 100 between the processing device 110, or the display device 115, or the database. The server may include any combination of a data server, a cloud server, a server associated with a XR service provider, proxy server, mail server, web server, application server (e.g., gaming application server), database server, communications server, home server, mobile server, or any combination thereof. The server may also transmit to the processing device 110 or the display device 115 a variety of XR information, such as rendering instructions, configuration information, control instructions, and other information, instructions, or commands relevant to splitting the graphics processing workload between the processing device 110 and the display device 115.

The database may store data that may include graphics resources, audio and/or video streams, and/or rendered multimedia content (e.g., rendered audio and/or video streams (e.g., frames)) for a XR environment, or commands relevant to processing composite layers for the processing device 110 and/or the display device 115. The processing device 110 and the display device 115 may retrieve the stored data from the database via the base station.

The network may provide encryption, access authorization, tracking, Internet Protocol (IP) connectivity, and other access, computation, modification, and/or functions. Examples of a network may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)) for example), etc. A network may include the Internet.

The base station may wirelessly communicate with the processing device 110 and the display device 115 via one or more base station antennas. For example, the base station may communication with the processing device 110 and display device 115 over one or more connections, including but not limited to, 345 MHz, Wi-Fi, BLUETOOTH®, BLUETOOTH® Low Energy, cellular, Z-WAVE®, 802.11, peer-to-peer, LAN, wireless local area network (WLAN), Ethernet, FireWire®, fiber optic, and/or other connection types related to wireless communication systems. A base station may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Thus, the processing device 110 and the display device 115 described herein may be able to communicate with various types of base stations and network equipment including macro eNBs, small cell eNBs, gNBs, relay base stations, and the like.

Figure 2:
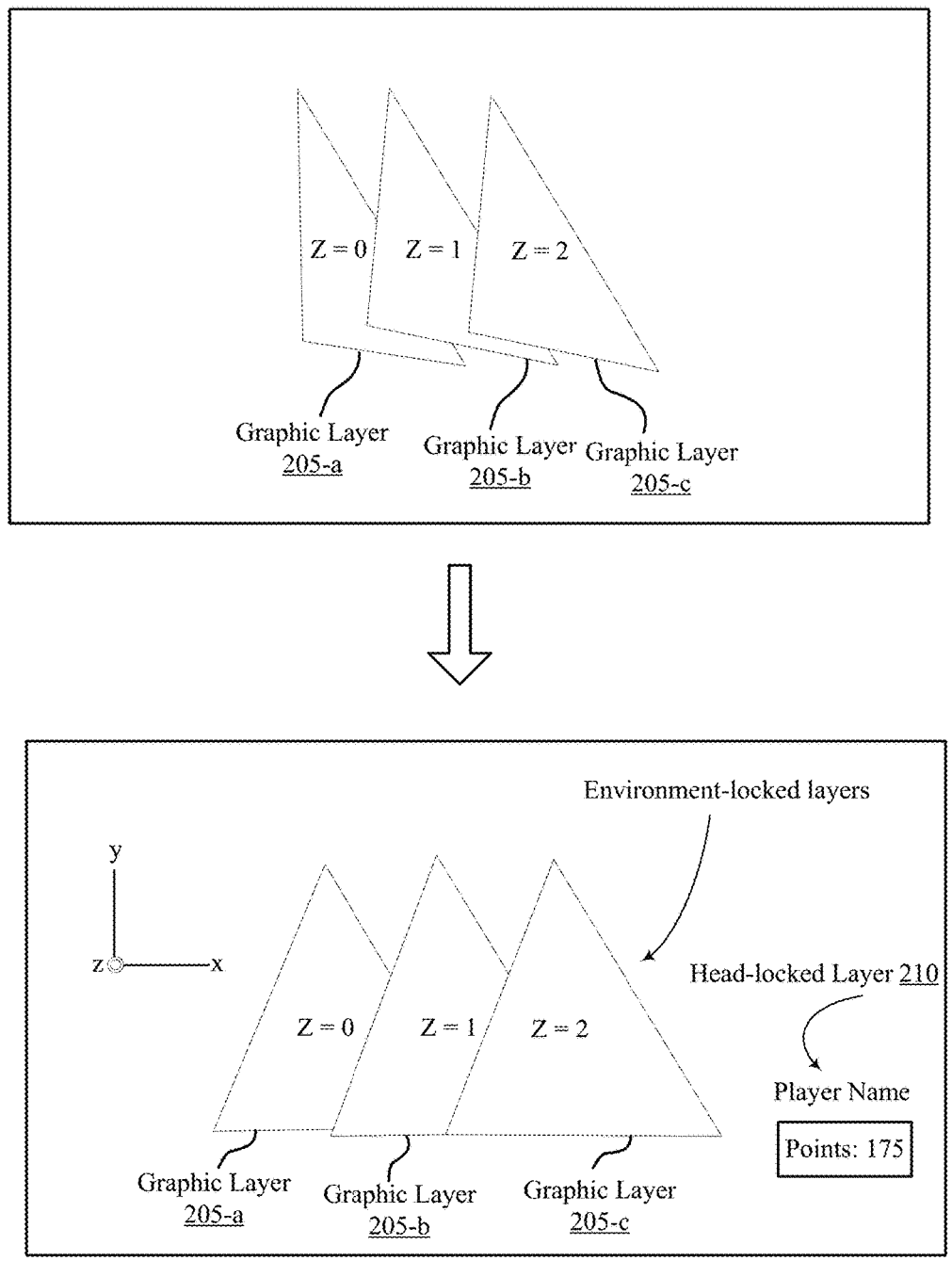
FIG. 2 shows an example of multiple rendered layers in accordance with aspects of the present disclosure.

FIG. 2 shows an example of multiple rendered graphic layers 200 in accordance with aspects of the present disclosure. The rendered layers 200 may include graphic layer 205-a, graphic layer 205-b, and graphic layer 205-c. Each graphic layer 205 may be assigned or associated with a Z order, which orders the graphic layers along the z-axis. Higher Z orders may correspond to points farther away from the origin in the +z-direction. So a graphic layer with a Z order of 1 (e.g., graphic layer 205-b) may appear on top of (e.g., in front of) a graphic layer with a Z order of 0 (e.g., graphic layer 205-a) but underneath (e.g., behind) a graphic layer with a Z order of 2. Thus, the Z order may indicate which graphic layer appears to cover another when two or more graphic layers overlap in the x-y plane. Compositing multiple rendered graphic layers into a single layer may allow a display to exhibit three-dimensional qualities. According to the techniques described herein, a processing device may sort graphic layers according to their Z orders. For example, the processing device may sort the graphic layers sequentially (e.g., graphic layers 200 would be sorted as graphic layer 205-a, graphic layer 205-b, and graphic layer 205-c).

After sorting the graphic layers, the processing device may divide the graphic layers into sets of consecutive graphic layers that are of the same type. Types of graphic layers include head-locked graphic layers and environment-locked graphic layers. A head-locked graphic layer may be a graphic layer that remains at the same place in the user's view (e.g., in the same place on the display) regardless of where the user is looking. For example, head-locked graphic layer 210 may include head-locked objects (e.g., game information and statistics) that remain in the lower-right portion of the user's view, regardless of the direction of the user's gaze. In contrast, an environment-locked graphic layer may be a graphic layer that changes based on the user's head position. Graphic layers 205 may be examples of environment-locked layers. Thus, while environment-locked graphic layers may change when the user's head moves, head-locked graphic layers remain in place (e.g., not change) regardless of the user's head position or movement. Because only environmental-locked graphic layers are responsive to user head movement, head-locked layers and environment-locked layers may be rendered onto separate graphics layers (e.g., a head-locked graphic layer, which may also be referred to as an overlay layer, may be composited on top of the rendered view constructed from the environment-locked layers).

Although described with reference to two types of graphic layers—head-locked and environment-locked graphic layers—the techniques describe herein can be implemented using any quantity of graphic layer types, and any types of graphic layers (e.g., three degrees of freedom (3 dof) graphic layers and six degrees of freedom (6 dof) graphic layers, among others).

After grouping consecutive graphic layers into sets by type, a processing device may divide each set so that graphic layers with frame rates within a threshold distance of each other are grouped into subsets. The processing device may then composite each subset of graphic layers into a respective composite layer and determine a frame rate for the composite layer. For example, the processing device may assign to a composite layer a frame rate that is the maximum frame rate of the subset of graphic layers making up the composite layer (e.g., if the frame rates of the graphic layers are 12 fps and 10 fps, then the assigned frame rate may be 12 fps). Or the assigned frame rate may be selected from a set of predetermined frame rates.

Next, the processing device may transmit the composite layers to a display device for display. Each composite layer may be sent in its own stream, and the streams may be sent at the same time. In some cases, the bandwidth allocated to each stream is based on the frame rate of the corresponding composite layer. The bandwidth may additionally or alternatively be allocated based on network limitations and/or the encode/decode abilities of the devices involved in the communication (e.g., the processing device and the display device).

Figure 3:
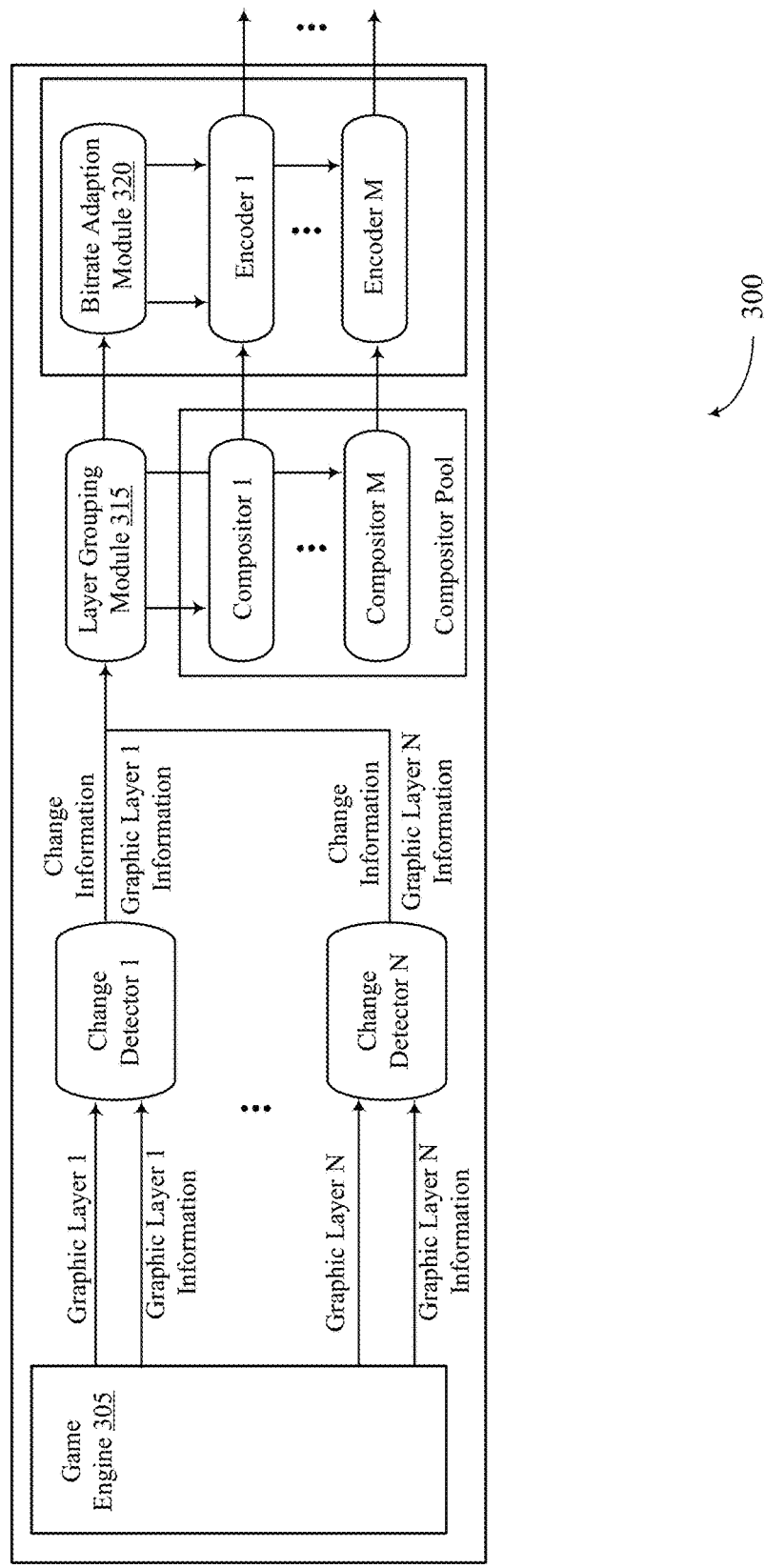
FIG. 3 shows a processing device that supports multiple graphic layers for XR in accordance with aspects of the present disclosure.

FIG. 3 shows a processing device 300 that supports multiple graphic layers for XR in accordance with aspects of the present disclosure. Processing device 300 may generate N graphic layers and transmit those N graphic layers in M streams to a display device, where N is greater than M. The graphic layers may be generated in response to information from the display device. In some examples, one or more of the N graphic layers (e.g., environment-locked graphic layers) may be generated based on the head position of a user of the display device (e.g., as communicated by the display device).

Processing device 300 may include a game engine 305. Game engine 305 may include components configured to generate multiple graphic layers. For example, game engine 305 may generate N graphic layers. The game engine 305 may pass the N graphic layers to N change detectors. For example, each graphic layer may be transferred to its own respective change detector. In some cases, the game engine 305 may also pass information about the graphic layers to the change detectors. For example, game engine 305 may pass information for graphic layer 1 to change detector 1. The information for graphic layer 1 may include the Z order of graphic layer 1, the texture of graphic layer 1, and/or the motion vector for graphic layer 1. Similarly, game engine 305 may pass information for graphic layers 2 through N to change detectors 2 through N, respectively. The texture of a graphic layer may refer to one or more aspects of the appearance of objects represented in the graphic layer. The motion vector of a graphic layer may refer to the magnitude and direction of movement associated with the graphic layer.

The change detectors may detect changes in the graphic layers 1 through N and send an indication of the changes to layer grouping module 315. For example, change detector 1 may detect that graphic layer 1 has changed by computing the difference between the last streamed frame for graphic layer 1 and the current frame for graphic layer 1. Or change detector 1 may detect that graphic layer 1 has changed based on the motion vector for graphic layer 1 (e.g., by determining that the magnitude of the motion vector for graphic layer 1 satisfies a threshold). Upon determining that a graphic layer has changed, a change detector may inform the layer grouping module 315 of the change (e.g., by passing along change information for the graphic layer). The change detectors may also transfer the N graphic layers to layer grouping module 315.

Layer grouping module 315 may receive the N graphic layers and some, all, or none of their corresponding information. Based on the change information from the change detectors, layer grouping module 315 may keep track of the frequency of change in the graphic layers. For example, layer grouping module 315 may count the number of times a graphic layer changes in x number of frames or seconds, which may be referred to as the change frequency of the graphic layer (or the frequency of change of the graphic layer). In some cases, the layer grouping module 315 may determine the frame rate for each graphic layer based on the frequency of change of the graphic layer. The determined frame rate may be proportional to the frequency of change of the graphic layer. For instance, the layer grouping module 315 may select a low frame rate for a graphic layer that has not changed in the last x frames (or seconds). And the layer grouping module 315 may select a high frame rate for a graphic layer that has changed more than a threshold number of times in the last x frames (or seconds). Thus, the layer grouping module 315 may assign a frame rate to a graphic layer based on the frequency of change of the graphic layer.

The layer grouping module 315 may form M groups of the N graphic layers (as described with reference to FIG. 4) and pass the M groups of graphic layers to compositors 1 through M. For example, layer grouping module 315 may pass group 1 to compositor 1, group 2 to compositor 2, group 3 to compositor 3, and so on and so forth up to the Mth group. So layer grouping module 315 may pass a different group of graphic layers to each compositor. Layer grouping module 315 may also indicate the number of groups, and their respective frame rates, to bitrate adaption module 320.

Each compositor may composite a group of graphic layers into a single composite layer (e.g., each compositor may take all of the graphic layers passed to it from layer grouping module 315 and compose them into one composite graphic layer). After compositing the groups of graphic layers, each compositor may pass the resulting composite layer to an encoder. For example, a first compositor layer ("composite layer 1") may be passed to encoder 1, a second composite layer ("composite layer 2") may be passed to encoder 2, and so on and so forth up to the Mth composite layer ("composite layer M"). Thus, M composite layers may be passed to M encoders.

The encoders may encode the composite layers for transmission to a display device. For example, encoder 1 may encode a first composite layer, encoder 2 may encode a second composite layer, encoder 3 may encode a third composite layer, and so on and so forth up to the Mth composite layer. So N graphic layers can be encoded using M encoders and M encode sessions, which may conserve processing resources (compared to using N encoders and N encode sessions).

An encoder may encode a composite layer so that it fits in a bandwidth selected by the bitrate adaption module 320. And the encoder may encode a composite layer so that it has a bit rate that matches the bit rate selected by the bitrate adaption module 320. The bitrate adaption module 320 may select a bandwidth and/or bitrate for a composite layer based on the frame rate assigned to the composite layer (e.g., the selected bandwidth and/or bitrate may be proportional to the frame rate). Additionally, or alternatively, the bitrate adaption module 320 may select the bandwidth and/or bitrate based on the available bandwidth of the communications network serving the processing device 300, or the encode abilities of the processing device 300, or the decode processing abilities of the target display device.

After encoding the composite layers, the encoders may pass the encoded composite layers to a transmitter for transmission to the display device. Each encoded composite layer may be transmitted over its own stream so that the display device receives M parallel streams (which may also be referred to as video sessions). The streams may be sent over the bandwidths selected by the bitrate adaption module 320. Thus, M streams may be used to convey N graphic layers.

Figure 4:
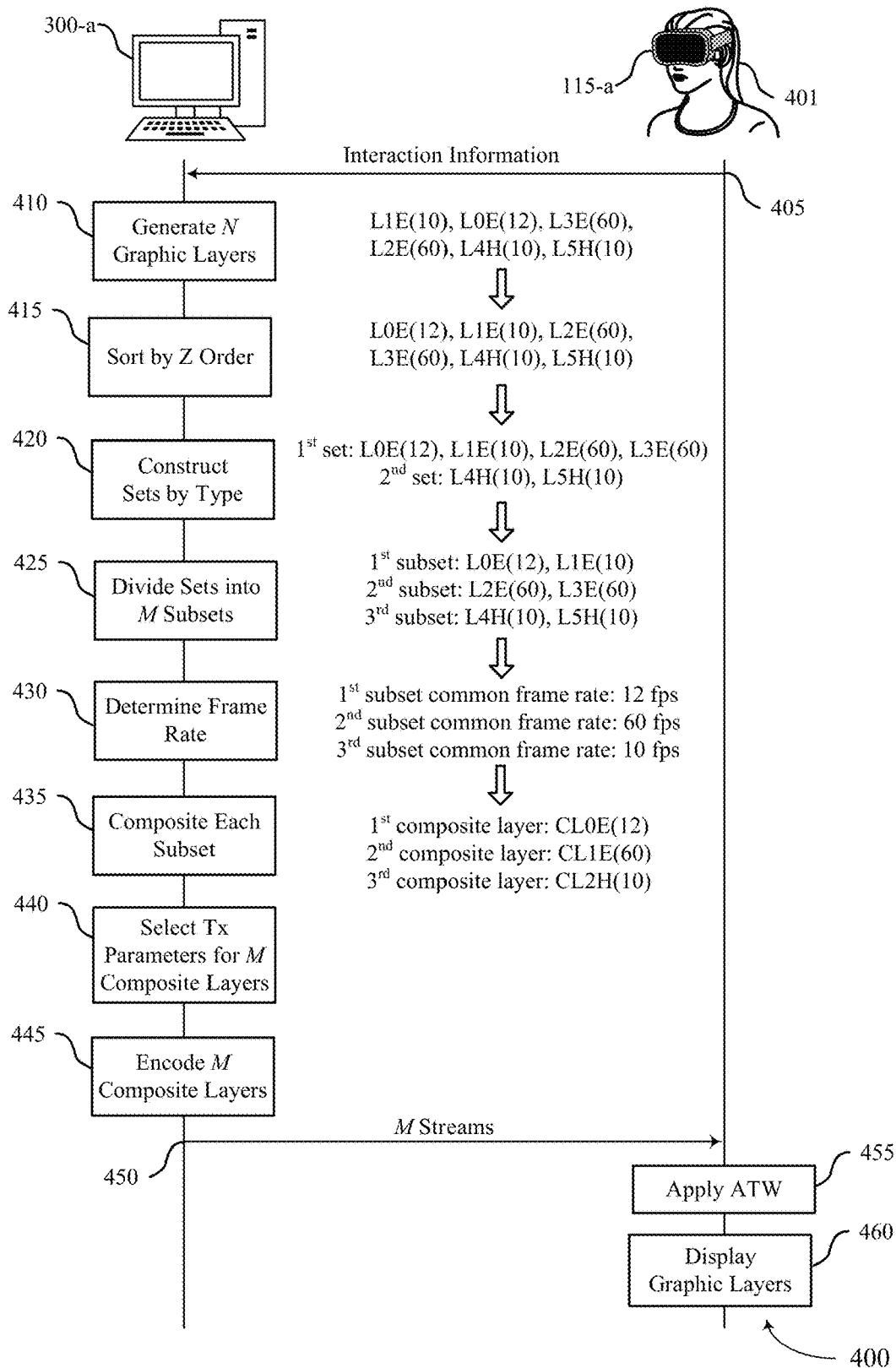
FIG. 4 shows a process flow that supports multiple graphic layers for XR in accordance with aspects of the present disclosure.

FIG. 4 shows a process flow 400 that supports multiple graphic layers for XR in accordance with aspects of the present disclosure. Process flow 400 may involve actions and communications by a processing device 300-*a* and a display device 115-*a*. Processing device 300-*a* may be an example of a processing device 110, as described with reference to FIG. 1, or a processing device 300, as described with reference to FIG. 3. Display device 115-*a* may be worn by a user 401 and may be an example of a display device 115 as described with reference to FIG. 1. The actions by processing device 300-*a* may be performed periodically and may allow N graphic streams to be transmitted over M streams, where M is less than N.

At 405, display device 115-*a* may send interaction information to processing device 300-*a*. The interaction information may include information about the position and movements of the user 401. In some cases, the interaction information includes an indication of the user's head position, movement, or gaze direction. At 410, processing device 300-*a* may generate N graphic layers, where N is greater than one. One or more of the graphic layers may be generated based on, or in response to, the interaction information received from display device 115-*a*. For example, the processing device 300-*a* may generate one or more environment-locked graphic layers responsive to information about the user's head position. The processing device 300-*a* may also generate one or more head-locked layers.

For the purpose of illustration, processing device 300-*a* may generate six (N=6) graphic layers: L1E(10), L0E(12), L3E(60), L2E(60), L4H(10), and L5H(10). The letter L may represent a graphic layer, and the number following L may represent the Z order of the graphic layer. So L1 may represent a graphic layer L with a Z order equal to one. The letter E may indicate that the graphic layer L is an environment-locked graphic layer and the letter H may indicate that the graphic layer L is a head-locked graphic layer. So L1E may represent an environment-locked graphic layer with a Z order of one. The number in the parenthesis may represent the frame rate of the graphic layer L in fps. So L1E(10) may represent an environment-locked graphic layer with a Z order of one and a frame rate of 10 fps. Thus, each graphic layer generated by processing device 300-*a* may be associated with a Z order, frame rate, and type.

In some cases, a graphic layer is assigned a frame rate when it is generated and then re-assigned a frame rate during the grouping process (e.g., the graphic layer may be assigned 30 fps at generation, then re-assigned 10 fps based on the frequency of change of the graphic layer). In other cases, a graphic layer may not be assigned a frame rate until later in the rendering process (e.g., the graphic layer may be assigned a frame rate by the layer grouping module based on the frequency of change of the graphic layer). Or a graphic layer may be assigned a frame rate at generation and maintain that frame rate throughout the rendering process. Although described with reference to environment-locked and head-locked graphic layers, the techniques described herein can be implemented for any combination of graphic layer types.

After generating the N graphic layers, processing device 300-a may, at 415, sort the N graphic layers by Z order. For example, processing device 300-a may sort the graphic layers so that they are ordered sequentially, starting from zero. So, going back to the ongoing example, processing device 300-a may sort the graphic layers as: L0E(12), L1E(10), L2E(60), L3E(60), L4H(10), and L5H(10).

After sorting the graphic layers, processing device 300-a may, at 420, construct sets of graphic layers by type. For example, processing device 300-a may group together consecutive graphic layers (with respect to Z order) that are of the same graphic layer type. For instance, with respect to the ongoing example, processing device 300-a may construct two sets of graphic layers: first set {L0E(12), L1E(10), L2E(60), L3E(60)} and second set {L4H(10), L5H(10)}. Thus, processing device 300-a may construct, for each type of graphic layer, one or more sets of graphic layers with consecutive Z orders.

At 425, processing device 300-a may divide each graphic layer set into M subsets of graphic layers based on the frame rates of the graphic layers in the set. For instance, processing device 300-a may group together graphic layers from the same set if their respective frame rates are similar (e.g., if the difference between the frame rates is within a threshold). So with regards to the ongoing example, processing device 300-a may divide the first set of graphic layers into two subsets: first subset {L0E(12), L1E(10)} and second subset {L2E(60), L3E(60)}. However, processing device 300-a may maintain the second set of graphic layers as a single subset (e.g., third subset {L4H(60), L5H(60)} because the frame rates of the graphic layers in the second set are all within a threshold value of each other. So after 425, processing device 300-a may have multiple (e.g., M=three) subsets of graphic layers: first subset {L0E(12), L1E(10)}, second subset {L2E(60), L3E(60)}, and third subset {L4H(60), L5H(60)}.

At 430, processing device 300-a may determine a common frame rate for the graphic layers in a subset of graphic layers (e.g., processing device 300-a may determine a common frame rate for each subset of graphic layers). The common frame rate for a subset may be based on the frame rates of the graphic layers within the subset. In a first example, processing device 300-a may determine the maximum frame rate of the graphic layers in the subset and select the common frame rate as the maximum frame rate. With respect to the ongoing example, processing device 300 may select a common frame rate of 12 fps for the graphic layers in the first subset because the maximum frame rate of first subset is 12 fps.

In a second example, processing device 300-a may select the common frame rate from a set of predetermined candidate frame rates. Or, if all of the graphic layers in a subset have the same frame rate (or a dominant frame rate, such as a frame rate that occurs more than the others), that frame rate may be selected as the common frame rate. With respect to the ongoing example, processing device 300-a may select a common frame rate of 60 fps for the second subset of graphic layers and a common frame rate of 10 fps for the third subset of graphic layers. When the common frame rate selected for a subset is the same as the existing frame rate for the individual graphic layers, there may be no additional re-composition overhead.

In some cases, processing device 300-a may adjust how it selects subsets of graphic layers so that the subsets are more or less restrictive. A more restrictive subset may be a subset that has inclusion requirements that are harder to satisfy compared to the inclusion requirements of a less restrictive subset. For example, a more restrictive subset may require for inclusion graphic layers that have frame rates that are exactly the same (e.g., 60 fps), whereas a less restrictive subset may include graphic layers that have frame rates that fall between two threshold frame rates (e.g., a graphic layer may be included in the subset if its frame rate is between 0 and 30 fps). Because fewer graphic layers satisfy the requirements of restrictive subsets compared to a less restrictive subsets, more restrictive subsets may result in a higher quantity of composite layers and streams. On the other hand, because less restrictive subsets include graphic layers with varying frame rates, the re-composition overhead may be higher for less restrictive subsets compared to more restrictive subsets. So a processing device 300-a may determine the inclusion requirements for a subset based on the number of desired streams and re-composition overhead.

At 435, processing device 300-a may composite each subset of graphic layers into a respective composite layer (CL). For instance, processing device 300-a may composite a first subset of graphic layers into a first composite layer, composite a second subset of graphic layers into a second composite layer, and so on and so forth. Each composite layer may be have a frame rate equal to the common frame rate selected at 430. With regards to the ongoing example, processing device 300-a may composite the first subset of graphic layers into a first composite layer (e.g., CL0E(12)) that has a frame rate of 12 fps. Processing device 300-a may composite the second subset of graphic layers into a second composite layer (e.g., CL1(60)) that has a frame rate of 60 fps. And processing device 300-a may composite the third subset of graphic layers into a third composite layer (e.g., CL2(10)) that has a frame rate of 10 fps. Although sent with the same frame rate, the graphic layers that make up a composite layer may still be associated with their respective Z orders.

In some cases, processing device 300-a may re-composite a subset of graphic layers. For example, processing device 300-a may detect (e.g., using a change detector as described with reference to FIG. 3) that one of the graphic layers in a subset has changed since it was last composited. Upon this detection, processing device 300-a may perform composition again so that the display device 115-a can be updated with the changed graphic layer.

At 440, processing device 300-a may select transmission parameters for the M composite layers. For example, processing device 300-a may select a bandwidth and/or bitrate for each composite layer. The bandwidth and/or bitrate for a composite layer may be based on the frame rate for the composite layer (e.g., higher bandwidths and/or bitrates may be used for higher frame rates) and/or the number of composite layers. Additionally or alternatively, the bandwidth and/or bitrate for a composite layer may be based on the bandwidth constraints or limitations of the serving network. Additionally or alternatively, the bandwidth and/or bit rate for a composite layer may be based on the encode abilities of processing device 300-a and/or the decode abilities of display device 115-a.

At 445, processing device 300-a may encode the M composite layers according to the transmission parameters selected at 440. For example, processing device 300-a may encode each composite layer so that it is it can be sent at the common frame rate, over the selected bandwidth, with the selected bitrate. Since only M composite layers are encoded, as opposed to N graphic layers, processing device 300-a can conserve processing resources during encoding (and display device 115-a can conserve processing resources during decoding).

At 450, processing device 300-*a* may transmit M streams containing M composite layers to display device 115-*a*. Each stream may carry a single composite layer. But because each composite layer represents multiple graphic layers, multiple graphic layers are conveyed per stream. Thus, the required throughput of the system may be satisfied even though fewer than N streams are used to carry N graphic layers to display device 115-*a*.

At 455, after receiving M composite layers in M streams, display device 115-*a* may perform asynchronous time warp (ATW) on one or more of the composite layers. For example, display device 115-*a* may perform ATW on the environment-locked graphic layers included in one of the composite layers. ATW may reduce the delay between a user's head motion and the updating of the display to match the user's motion. This delay may be referred to as motion to photon delay, and may arise when a split rendering system uses frame rates that are not high enough to deliver images that match the user's latest head pose. Thus, a display device may continue to show old frames, which creates judder that disorients the user (e.g., because the displayed environment does not keep up with the user's head movement).

To remedy or mitigate motion to photon delay, display device 115-*a* may perform ATW on the environment-locked graphic layers to be displayed. ATW may adjust (e.g., warp or transform) the graphic layers so that the resulting images match the user's current head pose. However, because head-locked graphic layers do not change with the user's head pose, they do not experience motion to photon delay. So display device 115-*a* may selectively apply ATW based on the type of graphic layer (e.g., by applying ATW to environment-locked graphic layers and refraining from applying ATW to head-locked graphic layers).

At 460, display device 115-*a* may display the M composite layers by displaying the N graphic layers represented by the M composite layers. Thus, display device 115-*a* may display to the user 401 a rendered image or video generated from the N graphic layers.

Figure 5:
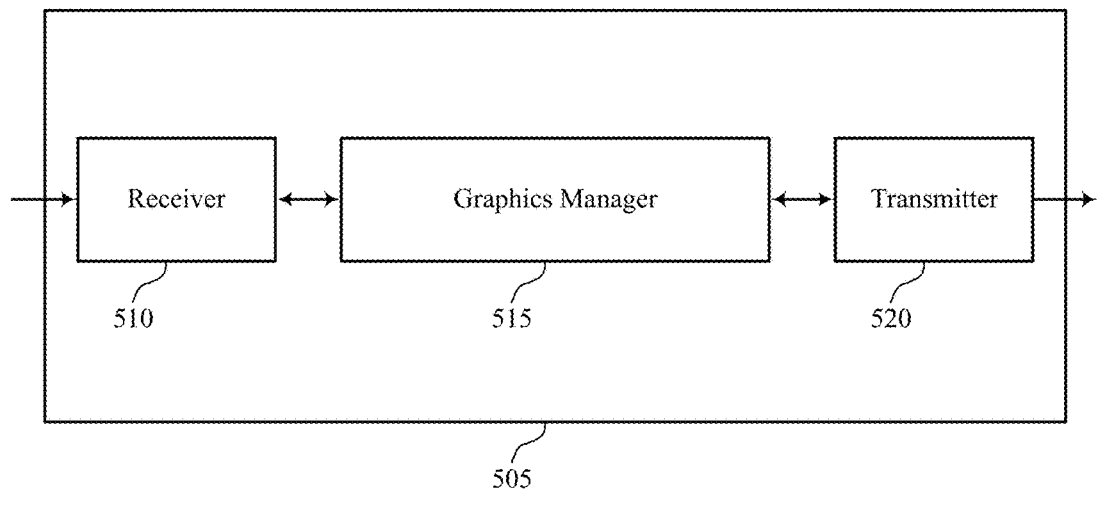
FIG. 5 shows a block diagram of a device that supports split rendering of multiple graphic layers for XR in accordance with aspects of the present disclosure.

FIG. 5 shows a block diagram 500 of a device 505 that supports split rendering of multiple graphic layers for XR in accordance with aspects of the present disclosure. The device 505 may be an example of aspects of a processing device as described herein. The device 505 may include a receiver 510, a graphics manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to split rendering of multiple graphic layers, etc.). Information may be passed on to other components of the device 505. The receiver 510 may be an example of aspects of the transceiver 720 described with reference to FIG. 7. The receiver 510 may use a single antenna or a set of antennas.

The graphics manager 515 may generate multiple graphic layers, and each graphic layer of the multiple graphic layers may be associated with a Z order, frame rate, and type. The graphics manager 515 may sort the graphic layers based on a Z order of each graphic layer, then construct, for each type of graphic layer, one or more sets of graphic layers with consecutive Z orders. The graphics manager 515 may divide each of the one or more sets of graphic layers into one or more subsets of graphic layers based on a frame rate for each graphic layer in the one or more sets of graphic layers. The graphics manager 515 may composite each subset of graphic layers into a respective composite layer associated with a frame rate that is based on a frame rate for each graphic layer in the one or more subsets of graphic layers. The graphics manager 515 may transmit (e.g., to another component of device 505, or to a display device), the composite layers in a set of streams each including a different composite layer. The graphics manager 515 may be an example of aspects of the graphics manager 710 described herein.

The graphics manager 515, or its sub-components, may be implemented in hardware, code (e.g., software or firmware) executed by a processor, or any combination thereof. If implemented in code executed by a processor, the functions of the graphics manager, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The graphics manager 515, or its sub-components, may be physically located at various positions, including being distributed such that portions of functions are implemented at different physical locations by one or more physical components. In some examples, the graphics manager 515, or its sub-components, may be a separate and distinct component in accordance with various aspects of the present disclosure. In some examples, the graphics manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device. In some examples, the transmitter 520 may be collocated with a receiver 510 in a transceiver module. For example, the transmitter 520 may be an example of aspects of the transceiver 720 described with reference to FIG. 7. The transmitter 520 may utilize a single antenna or a set of antennas.

Figure 6:
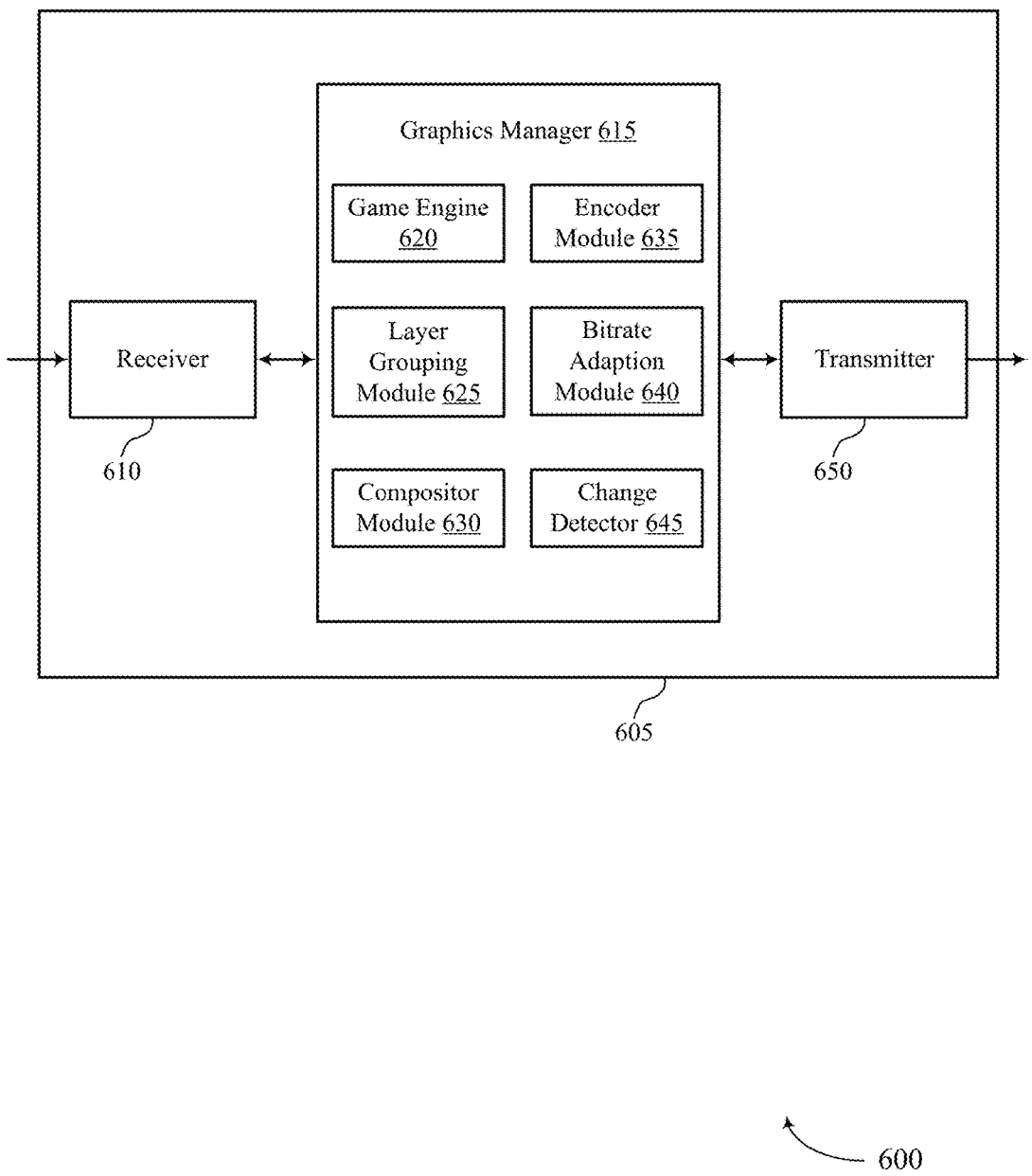
FIG. 6 shows a block diagram of a device that supports split rendering of multiple graphic layers for XR in accordance with aspects of the present disclosure.

FIG. 6 shows a block diagram 600 of a device 605 that supports split rendering of multiple graphic layers for XR in accordance with aspects of the present disclosure. The device 605 may be an example of aspects of a device 505 or a processing device as described herein. The device 605 may include a receiver 610, a graphics manager 615, and a transmitter 650. The device 605 may also include a processor. Each of these components may be in communication with one another (e.g., via one or more buses).

Receiver 610 may receive information such as packets, user data, or control information associated with various information channels (e.g., control channels, data channels, and information related to split rendering of multiple graphic layers, etc.). Information may be passed on to other components of the device. The receiver 610 may be an example of aspects of the transceiver 720 described with reference to FIG. 7. The receiver 610 may utilize a single antenna or a set of antennas.

The graphics manager 615 may be an example of aspects of the graphics manager 515 as described herein. The graphics manager 615 may include a game engine 620, a layer grouping module 625, a compositor module 630, and an encoder module 635. The graphics manager 615 may be an example of aspects of the graphics manager 710 described herein.

The game engine 620 may generate multiple graphic layers, and each graphic layer of the set of graphic layers may be associated with a Z order, frame rate, and type. The layer grouping module may identify the Z order, frame rate, and type of each graphic layer generated by the game engine 620. The layer grouping module 625 may sort the set of graphic layers based on a Z order of each graphic layer. The layer grouping module 625 may then construct, for each type of graphic layer, one or more sets of graphic layers with consecutive Z orders. Next, the layer grouping module 625 may divide each of the one or more sets of graphic layers into one or more subsets of graphic layers based on a frame rate for each graphic layer in the one or more sets of graphic layers. The layer grouping module 625 may pass the subsets of graphic layers to the compositor module 630.

The change detector 645 may detect changes in the frames of graphic layers. For example, the change detector 645 may detect a change in one or more frames of a graphic layer generated by the game engine 620. In some cases, the change detector 645 may detect that the graphic layer has changed by computing a difference between the last streamed frame of the graphic layer and a current frame of the graphic layer. In other cases, the change detector 645 may detect that the graphic layer has changed by determining that the magnitude of a motion vector of the graphic layer satisfies a threshold.

In some examples, the layer grouping module 625 may determine frame rates for graphic layers. For example, when the change detector 645 detects a change in one or more frames of a graphic layer since the graphic layer was last transmitted, the layer grouping module 625 may determine the frame rate for the graphic layer based on the detection. In some cases, the layer grouping module 625 may determine, in response to detection of the change, a frequency of change in graphic layer. In such cases, the frame rate assigned to a graphic layer may be determined based on the frequency of change in the graphic layer.

In some examples, the layer grouping module 625 may select the frame rates for the composite layers (e.g., the layer grouping module 625 may select a common frame rate for each composite layer). For example, the layer grouping module 625 may select, from a set of candidate frame rates, the frame rate associated with each composite layer. Or, when the layer grouping module 625 determines the maximum frame rate of the graphic layers in the subsets of graphic layers, the layer grouping module 625 may select the frame rate associated with the composite layer based on the maximum frame rate (e.g., the layer grouping module 625 may select the common frame rate of the composite layer to be the maximum frame rate in the corresponding subset of graphic layers).

The compositor module 630 may generate composite layers based on the subset of graphic layers. For example, compositor module 630 may composite each subset of graphic layers into a respective composite layer associated with (e.g., having) a frame rate that is based on a frame rate for each graphic layer in the one or more subsets of graphic layers. As discussed above, the frame rate of a composite layer may be determined by the layer grouping module 625. In some examples, the frame rate is the common frame rate described with reference to FIG. 4.

In some cases, the compositor module 630 may re-composite a subset of graphic layers (e.g., when one of its graphic layers changes). In such cases, the re-composited subset of graphic layers may be transmitted (e.g., by the encoder module 635, or the transmitter 650) in a stream as a composite layer.

The bitrate adaption module 640 may select bandwidths for streams that convey composite layers. The bitrate adaption module 640 may select a bandwidth for a stream based on the frame rate (e.g., the common frame rate) associated with the composite layer to be conveyed by the stream.

The encoder module 635 may encode each composite layer prior to streaming. The encoder module 635 may encode a composite layer so that it fits in an assigned bandwidth (e.g., a bandwidth selected by bitrate adaption module 640). The encoder module 635 may pass the encoded composite layers to other components of device 605, such as transmitter 650.

Transmitter 650 may transmit signals generated by other components of the device. In some examples, the transmitter 650 may be collocated with a receiver 610 in a transceiver module. For example, the transmitter 650 may be an example of aspects of the transceiver 720 described with reference to FIG. 7. The transmitter 650 may utilize a single antenna or a set of antennas. In some cases, the transmitter 650 transmits the composite layers in streams (e.g., over the air to a display device). For example, the transmitter 650 may transmit each composite layer it its own respective stream. Thus, the transmitter 650 may transmit (e.g., to display device), the composite layers in a set of streams, each of which conveys a different composite layer. The number of streams used to convey the composite layers may be less than the number of graphic layers generated by the game engine 620.

Figure 7:
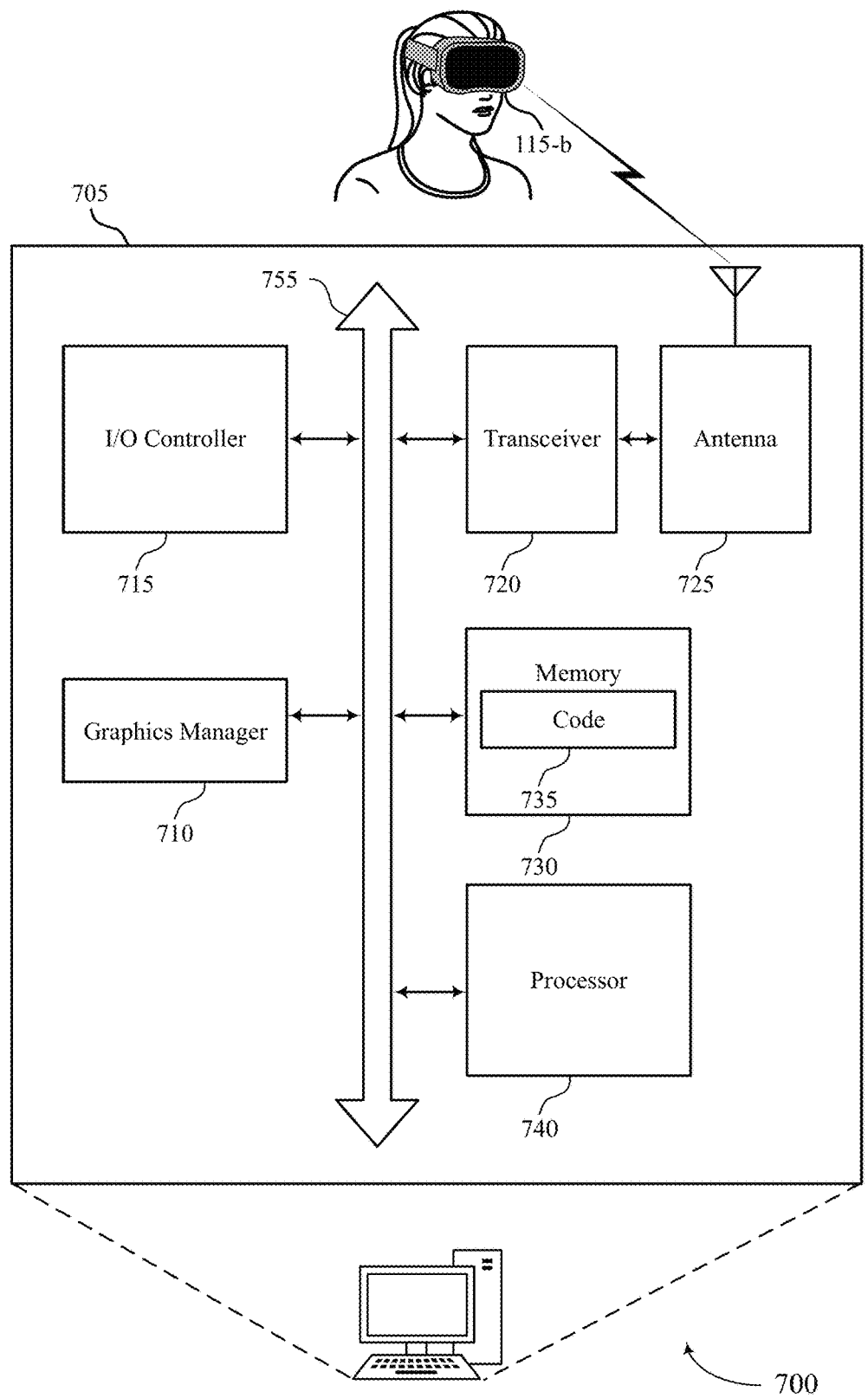
FIG. 7 shows a diagram of a system including that supports split rendering of multiple graphic layers for XR in accordance with aspects of the present disclosure.

FIG. 7 shows a diagram of a system 700 including that supports split rendering of multiple graphic layers for XR in accordance with aspects of the present disclosure. The system may include a device 705 and a display device 115-b. The device 705 may be an example of or include the components of a processing device as described herein. The device 705 may include components for bi-directional voice and data communications including components for transmitting and receiving communications, including a graphics manager 710, an I/O controller 715, a transceiver 720, an antenna 725, memory 730, and a processor 740. These components may be in electronic communication via one or more buses (e.g., bus 755).

The device 705 may be a processing device as described herein. The term "processing device" may be used herein to describe a device (e.g., a personal computing device, a desktop, a laptop, mobile computing device, and the like) that may render one or more frames, graphics resources, audio and/or video streams, and/or rendered multimedia content (e.g., rendered audio and/or video streams (e.g., frames)) for an XR environment. In some examples, the device 705 may render instructions and/or other features of the graphics resources, audio and/or video streams, and/or rendering instructions to be displayed by a respective display device (e.g., an HMD device).

The graphics manager 710 may be configured to perform the split rendering techniques described herein. For example, the graphics manager may be configured to generate a plurality of graphic layers; determine a Z order, frame rate, and type for each graphic layer; divide the plurality of graphic layers into a plurality of graphic layer groups based on the Z order, frame rate, and type of each graphic layer, the plurality of graphic layer groups less than the plurality of graphic layers; composite, for each graphic layer group, the graphic layers of the graphic layer group into a respective composite layer; and transmit the composite layers in a plurality of streams each comprising a different composite layer.

Thus, the graphics manager 710 may support a platform for one or more XR applications (e.g., entertainment application, gaming application, business application). The graphics manager 710 may support rendering elements that manages creation of 2-D or 3-D graphics. For example, in XR applications frames may be rendered at high speed to create realistic movement. The actual rendering may include a series of computations that the graphics manager 710 performs to create images based on 2D or 3D models, so that it can accurately and efficiently generate objects and character position on a display screen of a display device (e.g., HMD). The graphics manager may also manage movement and interaction among characters and objects in an XR environment. For example, the graphics manager 710 may receive a signal from a motion sensor of the display device indicating a position or a translational motion of a person associated with the display device. The graphics manager may also manage rendering video and/or audio for a display device without causing other components of the XR environment, such as graphics or audio rendering, to lag. The graphics manager 710 may be configured to receive and convert frames, graphic layers, composite layers, graphics resources, audio and/or video streams, and/or rendered multimedia content (e.g., rendered audio and/or video streams (e.g., frames)) into packets for transmission to a display device (e.g., display device 115-b).

The display device 115-b may be configured to perform the split rendering techniques described herein. For example, the display device 115-b may be configured to receive the composite layers in the plurality of streams; perform asynchronous time warp (ATW) on one or more of the composite layers; and display the composite layers. In some examples, the display device 115-b may be configured to transmit (e.g., to the device 705) an indication of a head position of a user of the display device 115-b. In such cases, the device 705 may be configured to generate at least one graphic layer of the plurality of graphic layers (e.g., an environment-locked graphic layer) based on the head position of the user.

The I/O controller 715 may manage input and output signals for the device 805. The I/O controller 715 may also manage peripherals not integrated into the device 805. In some cases, the I/O controller 715 may represent a physical connection or port to an external peripheral. For example, I/O controller 715 may connect and manage a display device (e.g., display device 115-b). In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 805 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device 705 may have more than one antenna 725, which may be capable of concurrently transmitting or receiving multiple wireless transmissions. For example, the device 705 may wirelessly communicate one or more frames, graphic layers, composite layers, graphics resources, audio and/or video streams, and/or rendered multimedia content (e.g., rendered audio and/or video streams (e.g., frames)) with display device 115-b and/or a base station, or another computing device (e.g., a beacon, a smartphone, a tablet) via the antenna(s) 725.

The memory 730 may include RAM and ROM. The memory 730 may store computer-readable, computer-executable code 735 including instructions that, when executed, cause the processor to perform various XR functions described herein. In some cases, the memory 730 may contain, among other things, a BIOS which may control basic hardware or software operation such as the interaction with peripheral components or devices.

The code 735 may include instructions to implement aspects of the present disclosure, including instructions to support split rendering of multiple graphic layers. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

The processor 740 may include an intelligent hardware device, (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting various VR functions such as frequency synchronization and phase correction). In some cases, the graphics manager 710 may be part of the processor 740.

As detailed above, graphics manager 710 and/or one or more components of the graphics manager 710 may perform and/or be a means for performing, either alone or in combination with other elements, one or more operations for performing split rendering of multiple graphic layers.

Figure 8:
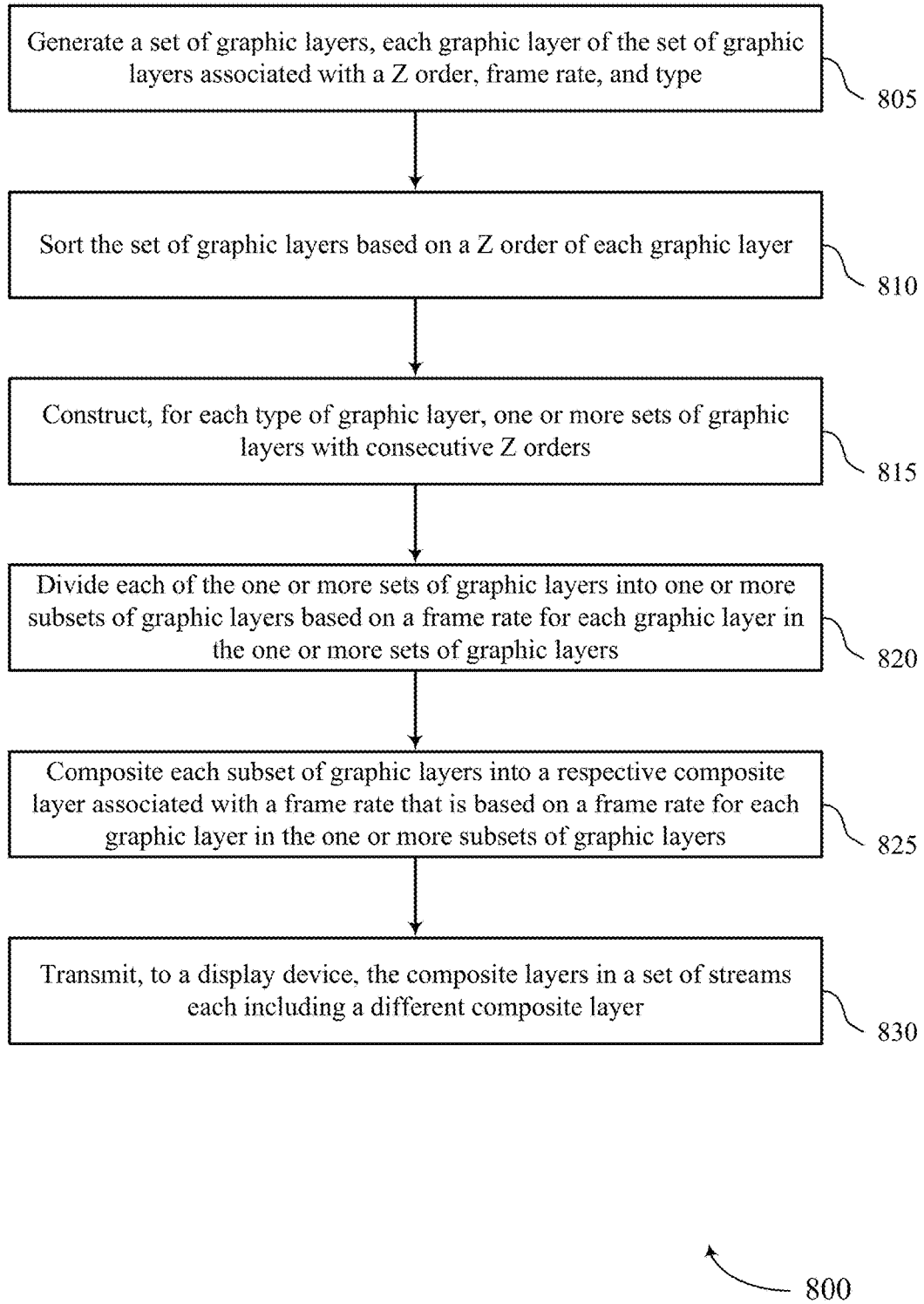
FIG. 8 shows a flowchart illustrating a method that supports split rendering of multiple graphic layers for XR in accordance with aspects of the present disclosure.

FIG. 8 shows a flowchart illustrating a method 800 that supports split rendering of multiple graphic layers for XR in accordance with aspects of the present disclosure. The operations of method 800 may be implemented by a processing device 110 or its components as described herein. The operations of method 800 may be performed by a graphics manager as described with reference to FIGS. 5 through 7. In some examples, a processing device 110 may execute a set of instructions to control the functional elements of the processing device 110 to perform the functions described below. Additionally or alternatively, a processing device 110 may perform aspects of the functions described below using special-purpose hardware.

At 805, the method may include generating a plurality of graphic layers, each graphic layer of the plurality of graphic layers associated with a Z order, frame rate, and type. The operations of 805 may be performed according to the methods described herein. In certain examples, aspects of the operations of 805 may be performed by a game engine as described with reference to FIG. 6.

At 810, the method may include sorting the plurality of graphic layers based on a Z order of each graphic layer. The operations of 810 may be performed according to the methods described herein. In certain examples, aspects of the operations of 810 may be performed by a layer grouping module as described with reference to FIG. 6.

At 815, the method may include constructing, for each type of graphic layer, one or more sets of graphic layers with consecutive Z orders. The operations of 815 may be performed according to the methods described herein. In certain examples, aspects of the operations of 815 may be performed by the layer grouping module as described with reference to FIG. 6.

At 820, the method may include dividing each of the one or more sets of graphic layers into one or more subsets of graphic layers based on a frame rate for each graphic layer in the one or more sets of graphic layers. The operations of 820 may be performed according to the methods described herein. In certain examples, aspects of the operations of 820 may be performed by the layer grouping module as described with reference to FIG. 6.

At 825, the method may include compositing each subset of graphic layers into a respective composite layer associated with a frame rate that is based on a frame rate for each graphic layer in the one or more subsets of graphic layers. The operations of 825 may be performed according to the methods described herein. In certain examples, aspects of the operations of 825 may be performed by a compositor module as described with reference to FIG. 6.

At 830, the method may include transmitting, to a display device, the composite layers in a plurality of streams each comprising a different composite layer. The operations of 830 may be performed according to the methods described herein. In certain examples, aspects of the operations of 830 may be performed by a transmitter as described with reference to FIG. 6, or performed by a transceiver as described with reference to FIG. 7.

It should be noted that the methods described above describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for rendering at a device, comprising:
   generating a plurality of graphic layers, each graphic layer of the plurality of graphic layers associated with a Z order, frame rate, and type;
   sorting the plurality of graphic layers based on a Z order of each graphic layer;
   constructing, for each type of graphic layer, one or more sets of graphic layers with consecutive Z orders;
   dividing each of the one or more sets of graphic layers into one or more subsets of graphic layers based on a frame rate for each graphic layer in the one or more sets of graphic layers;
   compositing each subset of graphic layers into a respective composite layer associated with a frame rate that is based on a frame rate for each graphic layer in the one or more subsets of graphic layers; and
   transmitting, to a display device, the composite layers in a plurality of streams each comprising a different composite layer.

2. The method of claim 1, further comprising:
   encoding each composite layer prior to transmitting; and
   selecting the bandwidth for each stream based on the frame rate of the associated composite layer.

3. The method of claim 1, further comprising:
   detecting a change in one or more frames of a graphic layer of the plurality of graphic layers since the graphic layer was last transmitted; and
   determining the frame rate for the graphic layer based on the detection.

4. The method of claim 3, wherein detecting that the graphic layer has changed comprises:
   computing the difference between a last streamed frame of the graphic layer and a current frame of the graphic layer.

5. The method of claim 3, wherein detecting that the graphic layer has changed comprises:
   determining that a magnitude of a motion vector of the graphic layer satisfies a threshold.

6. The method of claim 3, further comprising:
   determining, in response to detecting the change, a frequency of change in the graphic layer; and
   assigning a frame rate to the graphic layer based on the frequency of change.

7. The method of claim 1, further comprising:
   re-compositing a subset of graphic layers when one of the graphic layers of the subset changes; and
   transmitting the re-composited subset of graphic layers as a composite layer.

8. The method of claim 1, further comprising:
   selecting the frame rate associated with each composite layer from a set of candidate frame rates.

9. The method of claim 1, further comprising:
   determining a maximum frame rate of the graphic layers in the one or more subsets of graphic layers; and
   selecting the frame rate associated with the composite layer based at least in part on the maximum frame rate.

10. The method of claim 1, wherein the plurality of streams is less than the plurality of graphic layers.

11. A system comprising:
    a processing device configured to:
      generate a plurality of graphic layers;
      determine a Z order, frame rate, and type for each graphic layer;
      divide the plurality of graphic layers into a plurality of graphic layer groups based on the Z order, frame rate, and type of each graphic layer, the plurality of graphic layer groups less than the plurality of graphic layers;
      composite, for each graphic layer group, the graphic layers of the graphic layer group into a respective composite layer; and
      transmit the composite layers in a plurality of streams each comprising a different composite layer; and
    a display device configured to:
      receive the composite layers in the plurality of streams;
      perform asynchronous time warp (ATW) on one or more of the composite layers; and
      display the composite layers.

12. The system of claim 11, wherein the display device is configured to:
    transmit to the processing device an indication of a head position of a user of the display device.

13. The system of claim 12, wherein a first type of layer comprises layers that change based on the head position of the user, and a second type of layer comprises layers that do not change based on the head position of the user.

14. The system of claim 12, wherein the processing device is configured to generate at least one graphic layer of the plurality of graphic layers based on the head position of the user.

15. An apparatus for rendering, comprising:
    a processor;
    memory in electronic communication with the processor; and
    instructions stored in the memory and executable by the processor to cause the apparatus to:
      generate a plurality of graphic layers, each graphic layer of the plurality of graphic layers associated with a Z order, frame rate, and type;
      sort the plurality of graphic layers based on a Z order of each graphic layer;
      construct, for each type of graphic layer, one or more sets of graphic layers with consecutive Z orders;
      divide each of the one or more sets of graphic layers into one or more subsets of graphic layers based on a frame rate for each graphic layer in the one or more sets of graphic layers;
      composite each subset of graphic layers into a respective composite layer associated with a frame rate that is based on a frame rate for each graphic layer in the one or more subsets of graphic layers; and
      transmit, to a display device, the composite layers in a plurality of streams each comprising a different composite layer.

16. The apparatus of claim 15, wherein the instructions are further executable by the processor to cause the apparatus to:
- encode each composite layer prior to transmitting; and
- select the bandwidth for each stream based on the frame rate of the associated composite layer.

17. The apparatus of claim 15, wherein the instructions are further executable by the processor to cause the apparatus to:
- detect a change in one or more frames of a graphic layer of the plurality of graphic layers since the graphic layer was last transmitted; and
- determine the frame rate for the graphic layer based on the detection.

18. The apparatus of claim 17, wherein the instructions executable to detect the change comprises instructions executable by the processor to cause the apparatus to:
- compute the difference between a last streamed frame of the graphic layer and a current frame of the graphic layer.

19. The apparatus of claim 17, wherein the instructions executable to detect the change comprises instructions executable by the processor to cause the apparatus to:
- determine that a magnitude of a motion vector of the graphic layer satisfies a threshold.

20. The apparatus of claim 17, wherein the instructions are further executable by the processor to cause the apparatus to:
- determine, in response to detecting the change, a frequency of change in the graphic layer; and
- assign a frame rate to the graphic layer based on the frequency of change.

* * * * *